United States Patent
Lin et al.

(10) Patent No.: US 10,444,808 B2
(45) Date of Patent: Oct. 15, 2019

(54) USB CONTROL APPARATUS AND SIGNAL CONTROL METHOD FOR THE SAME

(71) Applicant: Delta Electronics, Inc., Taoyuan (TW)

(72) Inventors: Shou-Chieh Lin, Taoyuan (TW); Chang-Tai Chen, Taoyuan (TW); Yu-Jen Chen, Taoyuan (TW); Tien-He Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 15/840,275

(22) Filed: Dec. 13, 2017

(65) Prior Publication Data

US 2018/0196486 A1 Jul. 12, 2018

(30) Foreign Application Priority Data

Jan. 6, 2017 (CN) .................. 2017 2 0012780 U

(51) Int. Cl.
| | |
|---|---|
| *G06F 13/38* | (2006.01) |
| *G06F 1/26* | (2006.01) |
| *G06F 13/42* | (2006.01) |
| *H01R 29/00* | (2006.01) |
| *H01R 24/60* | (2011.01) |

(52) U.S. Cl.
CPC .............. *G06F 1/26* (2013.01); *G06F 13/382* (2013.01); *G06F 13/4282* (2013.01); *G06F 2213/0042* (2013.01); *H01R 24/60* (2013.01); *H01R 29/00* (2013.01)

(58) Field of Classification Search
CPC ....... G06F 13/382; G06F 13/4282; G06F 1/26

USPC .......................................................... 710/315
See application file for complete search history.

(56) References Cited

U.S. PATENT DOCUMENTS

| | | | | |
|---|---|---|---|---|
| 2009/0045802 A1* | 2/2009 | Matias | ................... | G01R 19/14 324/133 |
| 2010/0141266 A1* | 6/2010 | Cui | ......................... | G01R 31/30 324/538 |
| 2012/0137026 A1* | 5/2012 | Shen | ................ | G01R 31/31721 710/19 |
| 2012/0153993 A1* | 6/2012 | Xie | .......................... | G06F 1/266 327/77 |
| 2013/0019113 A1* | 1/2013 | Yamaya | .................. | G06F 1/266 713/300 |
| 2015/0249393 A1* | 9/2015 | Zhang | ............... | H02M 3/33523 363/21.15 |
| 2015/0295441 A1* | 10/2015 | Winger | .................. | H02J 7/0052 320/107 |

(Continued)

*Primary Examiner* — Christopher B Shin
(74) *Attorney, Agent, or Firm* — Muncy, Geissler, Olds & Lowe, P.C.

(57) ABSTRACT

A USB control apparatus is connected between a power supply and an external interface, and the USB control apparatus includes a first connection port connected to the power supply; a second connection port connected to the external interface; a control unit connected to the first connection port; and a first conversion unit connected between the control unit and the second connection port. The control unit detects a power source outputted from the power supply and outputs first information to the first conversion unit. The first conversion unit detects the type of a connection port of the external interface. The first conversion unit converts the first information into second information corresponding to the connection port of the external interface to the second connection port.

17 Claims, 7 Drawing Sheets

(56) References Cited

U.S. PATENT DOCUMENTS

| | | | |
|---|---|---|---|
| 2016/0116928 A1* | 4/2016 | Motoki | G05F 1/575 |
| | | | 323/280 |
| 2016/0202743 A1* | 7/2016 | Li | G06F 1/26 |
| | | | 710/313 |
| 2016/0219664 A1* | 7/2016 | Ellenberger | H05B 33/0842 |
| 2018/0131148 A1* | 5/2018 | Liu | G05B 15/02 |
| 2018/0138724 A1* | 5/2018 | Hu | H02J 7/0036 |
| 2018/0241096 A1* | 8/2018 | Kaechi | H01M 10/44 |

* cited by examiner

USB CONTROL APPARATUS AND SIGNAL CONTROL METHOD FOR THE SAME

BACKGROUND OF THE INVENTION

Field of the Invention

The present invention relates to a USB control apparatus and a signal control method for the same, and especially to a USB Type-C control apparatus capable of remotely controlling and the signal control method for the same.

Description of Prior Art

The most important characteristic of USB Type-C power supply is switching power supply output voltage through a USB PD (USB Power Delivery). Therefore, it is needed to test whether an output of the power supply is normal with a USB control apparatus cooperating with a test interface before the USB Type-C power supply leaves the factory. The USB control apparatus cooperating with the test interface is used to test the power supply in RD testing, to test the power supply in test station of factory, or to perform simple tests at the user side.

However, the existing technology uses a remote control switch board (Relay Card) cooperating with a USB Type-C button control board as the USB Type-C control apparatus, and the USB Type-C control apparatus of prior art has the following drawbacks:

1. A test interface only can switch voltage, without receiving other information: because the existing technology uses a remote control switch board (Relay Card) cooperating with a USB Type-C button control board as the USB Type-C control apparatus, only an output voltage of a power supply can be switched, other information is not received, furthermore, whether the voltage is successfully switched cannot be ensured.

2. A USB control apparatus needs a corresponding test interface: a connection port that the USB control apparatus outputs to the test interface is a fixed type, thus a fixed test interface is needed for cooperation, resulting in usage inconvenience.

3. A volume of the USB control apparatus is large: because the remote control switch board (Relay Card) cooperating with the USB Type-C button control board is used as the USB Type-C control apparatus, the volume of the USB control apparatus cannot be decreased, and cannot be integrated in a system (Burn in system).

Therefore, it is an object to develop a USB control apparatus and a signal control method for the same, cooperating with a conversion unit to convert the signal type of accommodation test interface connection port, and capturing power information of a power supply through a control unit, then an output power of the power supply can be determined and adjusted.

SUMMARY OF THE INVENTION

In order to solve the above-mentioned problem, the present invention provides a USB control apparatus to overcome the above-mentioned problem. Accordingly, the USB control apparatus of the present invention is connected between a power supply and an external interface. The USB control apparatus includes a first connection port connected to the power supply; a second connection port connected to the external interface; a control unit connected to the first connection port; and a first conversion unit connected between the control unit and the second connection port. The control unit detects a first input source outputted from the power supply through the first connection port, and outputs first information to the first conversion unit according to the first input source; the first conversion unit detects a type of a connection port of the external interface and converts the first information into second information corresponding to the connection port of the external interface to the second connection port.

In an embodiment, the first conversion unit receives a first control signal outputted from the external interface through the second connection port, and the first conversion unit converts the first control signal into a second control signal to the control unit; the control unit adjusts a voltage value of the first input source of the first connection port according to the second control signal.

In an embodiment, the control unit communicates with the first conversion unit through an asynchronous serial communication port, and the control unit receives the second control signal and outputs the first information to the first conversion unit through the asynchronous serial communication port.

In an embodiment, the control unit detects the first input source, adjusts the voltage value of the first input source, and communicates with the power supply connected with the first connection port through a transmission route.

In an embodiment, the USB control apparatus further includes a display unit set. The display unit set is connected to the control unit and displays whether the control unit detects the first input source or whether the control unit adjusts the voltage value of the first input source through the transmission route.

In an embodiment, the display unit set displays whether a ground voltage of the USB control apparatus is normal.

In an embodiment, the display unit set includes a display unit. The display unit is connected to the control unit. The control unit adjusts brightness of the display unit according to the voltage value of the first input source.

In an embodiment, the USB control apparatus further includes a first circuit board having a first interface; a second circuit board having a second interface. The first connection port and the display unit set are disposed on the first circuit board, and the control unit is disposed on the second circuit board; the first connection port and the display unit set are connected to the control unit by a joint between the first interface and the second interface.

In an embodiment, the USB control apparatus further includes a second conversion unit connected between the first connection port and the control unit, and converts the first input source into an input voltage to the control unit. A power source of the USB control apparatus is the first input source.

In an embodiment, the control unit receives a second input source outputted from the external interface through the second connection port. A power source of the USB control apparatus is the second input source.

In an embodiment, the first connection port is one of a male connection port and a female connection port, and is connected to the power supply with a USB power delivery function.

In order to solve the above-mentioned problem, the present invention provides a signal control method to overcome the above-mentioned problem. Accordingly, the signal control method of the present invention is used for signal controls between a power supply and an external interface, the signal control method includes steps of: (a) providing a USB control apparatus to detect a type of a connection port of the external interface; (b) connecting the USB control apparatus to the power supply, and detecting a first input source outputted from the power supply; (c) converting the first input source into second information corresponding to the connection port of the external interface, and outputting the second information to the external interface; and (d) adjusting a voltage value of the first input source according to a first control signal outputted from the external interface by the USB control apparatus.

In an embodiment, the signal control method further includes a step of: providing a display unit set, the display unit set displays whether a control unit in the USB control apparatus detects the first input source or whether the control unit adjusts the voltage value of the first input source.

In an embodiment, the signal control method further includes a step of: displaying whether a ground voltage of the USB control apparatus is normal by the display unit set.

In an embodiment, the signal control method further includes a step of: adjusting brightness of the display unit according to the voltage value of the first input source by the control unit.

In an embodiment, a power source of the USB control apparatus is the first input source.

In an embodiment, a power source of the USB control apparatus is a second input source outputted from the external interface.

BRIEF DESCRIPTION OF DRAWING

One or more embodiments of the present invention are illustrated by way of example and not limitation in the figures of the accompanying drawings, in which like references indicate similar elements. These drawings are not necessarily drawn to scale.

DETAILED DESCRIPTION OF THE INVENTION

Figure 1:
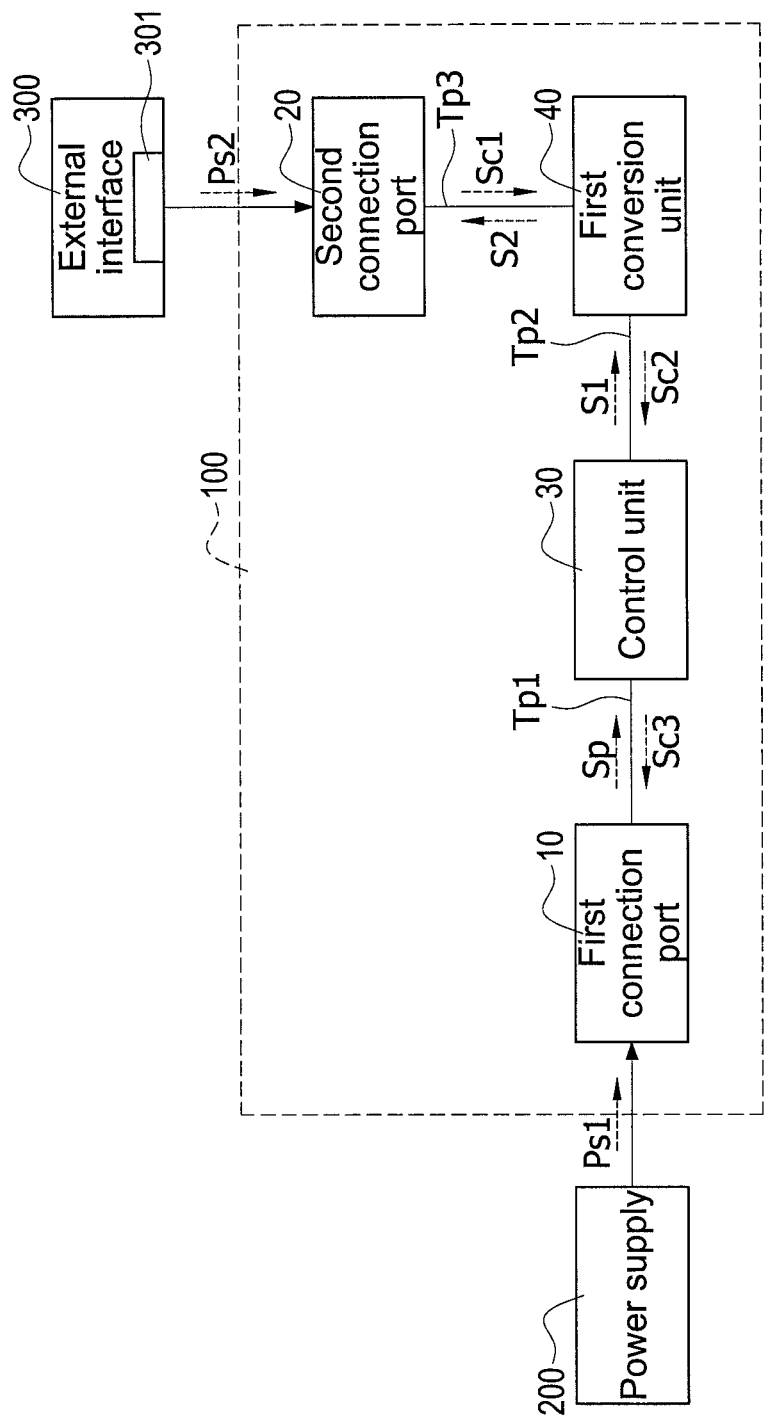
FIG. 1 shows a circuit block diagram of a USB control apparatus according to a first embodiment of the present invention.

Please refer to FIG. 1, which shows a circuit block diagram of a USB control apparatus according to a first embodiment of the present invention. The USB control apparatus 100 is connected between a power supply 200 and an external interface 300, and the USB control apparatus 100 includes a first connection port 10, a second connection port 20, a control unit 30 and a first conversion unit 40. The first connection port 10 is connected to an output of the power supply 200, and receives a first input source Ps1 from the output of the power supply 200. The second connection port 20 is connected to the external interface 300, and receives a second input source Ps2 from an output of the external interface 300. It should be noted that the first connection port 10 is a USB Type-C connection port, and connected to the power supply 200 with USB power delivery (USB PD) function. Besides, in the embodiment, the first connection port 10 can be, for example but not limited to, a male connection port, a female connection port, or both a male connection port and a female connection port. In other words, as long as it is a connection port of the USB Type-C type, it should be included in a scope of the embodiment.

Please refer to FIG. 1 again, the control unit 30 is connected to the first connection port 10 through a first transmission route Tp1, and communicates with the power supply 200 via the first transmission route Tp1. The first conversion unit 40 is connected to the control unit 30 through a second transmission route Tp2, and communicates with the control unit 30 via the second transmission route Tp2. The first conversion unit 40 is connected to the second connection port 20 through a third transmission route Tp3, and communicates with the external interface 300 via the third transmission route Tp3. In the embodiment, it should be noted that the first transmission route Tp1 and the third transmission route Tp3 can be, for example but not limited to, a circuit board layout trace, a bus or transmission line, and the first transmission route Tp1 and the third transmission route Tp3 can be a transmission route of signals, information or power between two devices. Besides, in the embodiment, the second transmission route Tp2 is, for example but not limited to, an universal asynchronous receiver/transmitter (UART), and the second transmission route Tp2 can be, for example but not limited to, a circuit board layout trace, a bus or transmission line.

As shown in FIG. 1, the first conversion unit 40 mainly converts signals, information or power between the second transmission route Tp2 and the third transmission route Tp3. For example, as shown in FIG. 1, the external interface 300 is connected to the second connection port 20 of the USB control apparatus 100 through a third connection port 301. However, there are many different types of the external interface 300 could be used to connect to and control the USB control apparatus 100, and third connection ports 301 of various external interfaces 300 have different specifications, such as RS232, RS485, HDMI, USB, etc. Therefore, when the external interface 300 is connected to the second connection port 20, the first conversion unit 40 detects the type of the third connection port 301, and adjusts a signal conversion type (for example, UART converted to RS232, or RS485 converted to UART) of the first conversion unit 40 through the second connection port 20.

Refer to FIG. 1 again, when the output of the power supply 200 is connected to the first connection port 10, the control unit 30 detects a first input source Ps1 outputted from the power supply through the first connection port 10, and receives power information Sp of the first input source Ps1 through the first transmission route Tp1. The control unit 30 outputs first information S according to the received power information Sp of the first input source Ps1, and the first conversion unit 40 receives the first information S1 through the second transmission route Tp2. The first conversion unit 40 converts the first information S1 to second information S2 corresponding to the signal type of the third connection port 301, the second connection port 20 transmits the second information S2 to the external interface 300 through the third transmission route Tp3. The external interface 300 can obtain information of the power supply 200 through the second information S2. The information of the power supply 200 includes, for example but not limited to, a current output voltage of the power supply 200, the different voltage sets supportable by the power supply 200, a maximum output current of the power supply 200 and success/failure of switching between different voltages.

As shown in FIG. 1, the external interface 300 outputs the second input source Ps2 to the second connection port 20, and the first conversion unit 40 receives a first control signal Sc1 of the second input source Ps2 on the second connection port 20, and converts the first control signal Sc1 to a second control signal Sc2 compatible with the control unit 30 through the third transmission route Tp3. The control unit 30 outputs a third control signal Sc3 after receiving the second control signal Sc2 through the second transmission route Tp2. The first connection port 10 transmits the third control signal Sc3 to the power supply 200 through the first transmission route Tp1, to adjust a first input source Ps1 at the output of the power supply 200.

For example, as shown in FIG. 1, when the external interface 300 is connected to the USB control apparatus 100, the first conversion unit 40 detects the type (assumed to be RS485) of the third connection port 301, and adjusts the signal conversion type of the first conversion unit 40 through the second connection port 20. When the output of the power supply 200 is connected to the first connection port 10, the control unit 30 outputs the first information S1 through the asynchronous serial communication port (UART), and the first conversion unit 40 converts the first information S1 into the second information S2 of RS485 type, and outputs the second information S2 to the external interface 300. The external interface 300 obtains the current output voltage (assumed to be 5V) of the power supply 200, and the voltage sets supportable by the output power (assumed to be 5V, 10V, 15V) according to the second information S2. The external interface 300 adjusts the current output voltage 5V of the power supply 200 to 10V, thus outputting a first control signal Sc1 of the second input source Ps2 to the first conversion unit 40, and the first conversion unit 40 converts the first control signal Sc1 into to the second control signal Sc2 compatible with the control unit 30 to the control unit 30. The control unit 30 outputs the third control signal Sc3 to the output of the power supply 200 according to the second control signal Sc2, making the power supply 200 adjust the current output voltage 5V to 10V according to the third control signal Sc3.

Figure 2:
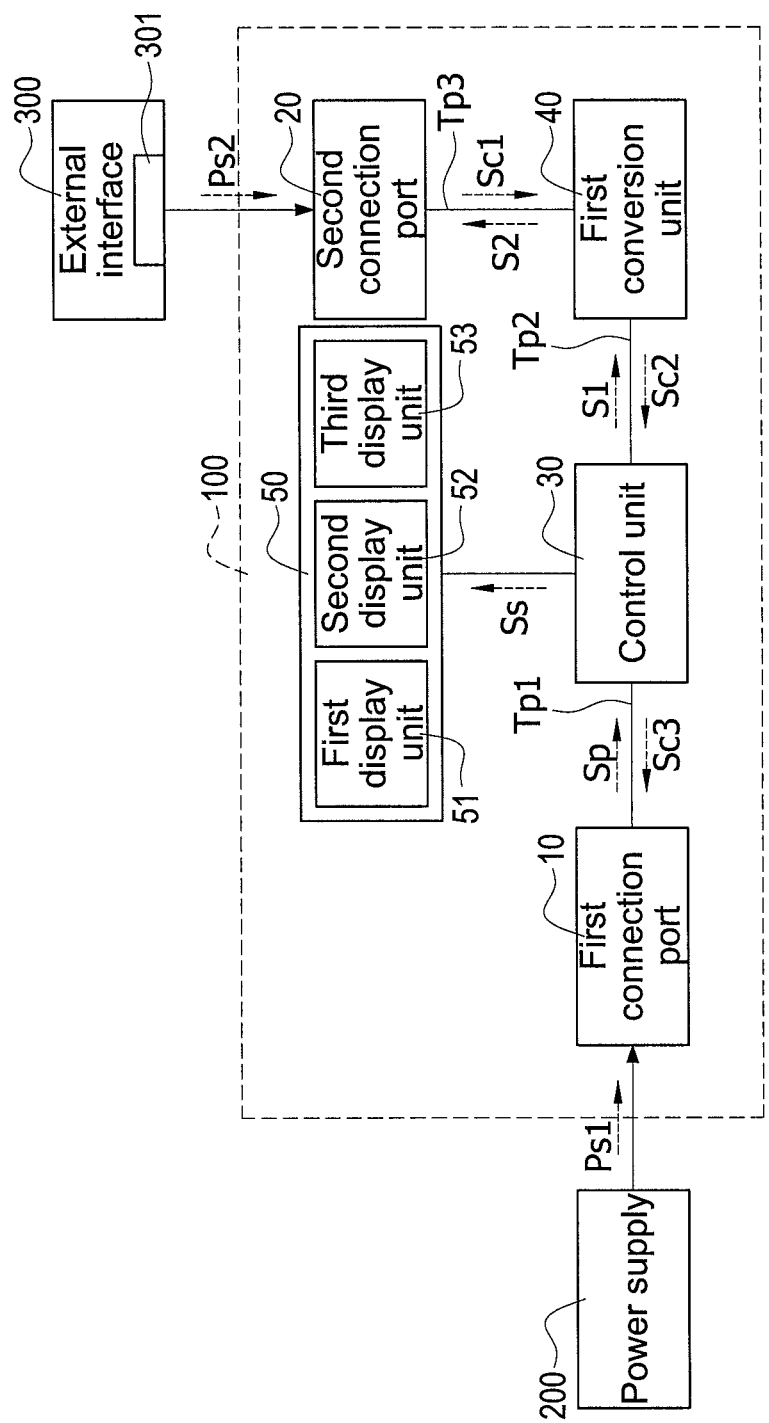
FIG. 2 shows a circuit block diagram of a USB control apparatus according to a second embodiment of the present invention.

Please refer to FIG. 2, which shows a circuit block diagram of a USB control apparatus according to a second embodiment of the present invention. Refer also to FIG. 1, the USB control apparatus 100 further includes a display unit set 50. The display unit set 50 is connected to the control unit 30 and displays a current status of the USB control apparatus 100 according to a display signal Ss outputted from the control unit 30. Refer to FIG. 2 again, the display unit set 50 includes a first display unit 51, a second display unit 52 and a third display unit 53. The first display unit 51 displays whether the control unit 30 detects the first input source Ps1 through the first transmission route Tp1, or whether the control unit 30 outputs the third control signal Sc3 to adjust the first input source Ps1 through the first transmission route Tp1, thus acquiring the communication status between the control unit 30 and the power supply 200. The second display unit 52 displays whether a ground voltage (potential) of the USB control apparatus 100 is normal to determine whether the USB control apparatus 100 is normal or damaged. The third display unit 53 displays the voltage of the first input source Ps1, and when control unit 30 outputs the third control signal Sc3 to increase or decrease the voltage of the first input source Ps1 through the first transmission route Tp1, the third display unit 53 correspondingly displays a difference between the increased and decreased voltages of the first input source Ps1. For example, when the control unit 30 outputs the third control signal Sc3 to increase the voltage of the first input source Ps1 through the first transmission route Tp1, the control unit 30 outputs the display signal Ss to increase brightness of the third display unit 53. On the contrary, when the control unit 30 outputs the third control signal Sc3 to decrease the voltage of the first input source Ps1 through the first transmission route Tp1, the control unit 30 outputs the display signal Ss to decrease brightness of the third display unit 53. In the embodiment, it should be noted that the display unit set 50 is LED lamp, but not limited. In other words, the display unit set 50 may be implemented to provide light-sound display, picture display, or text display.

Figure 3A:
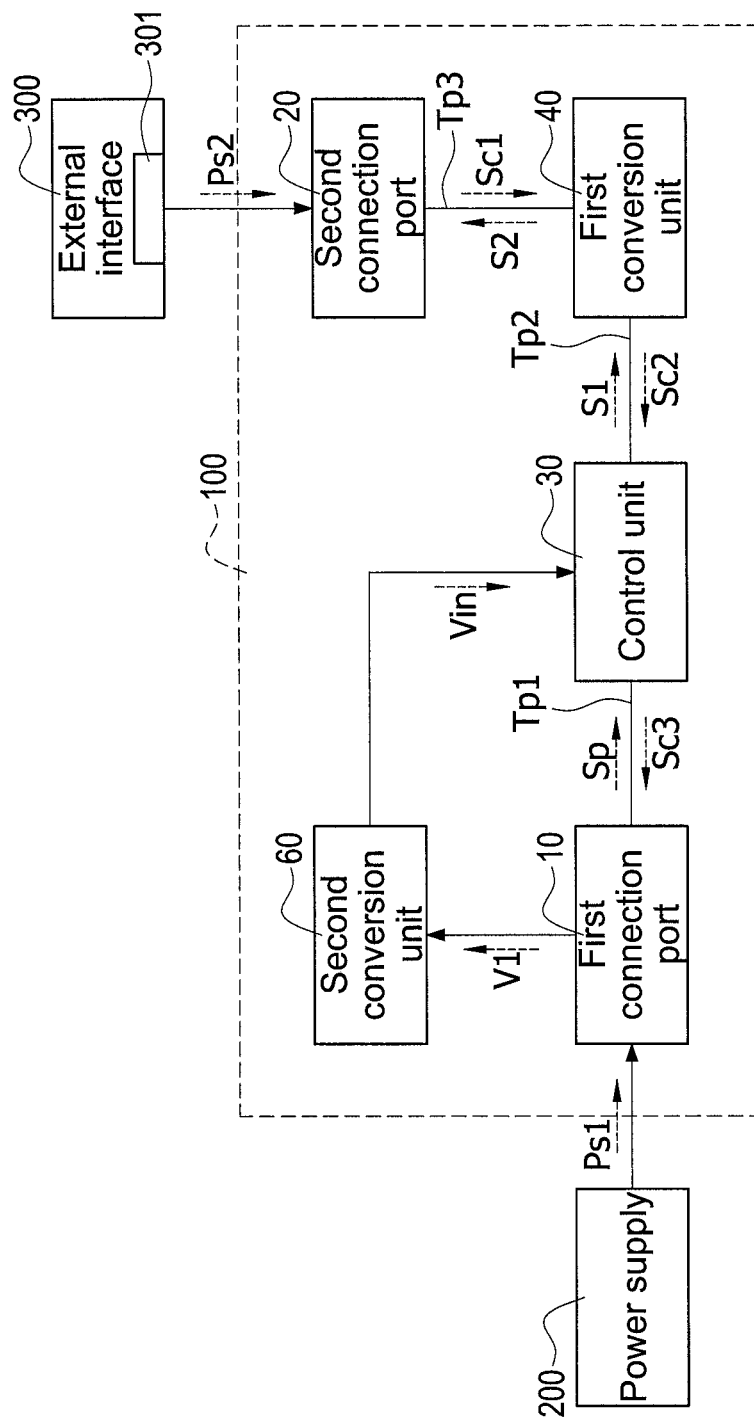
FIG. 3A shows a circuit block diagram about a power supply structure of a USB control apparatus according to a first embodiment of the present invention.

Please refer to FIG. 3A, which shows a circuit block diagram about a power supply structure of a USB control apparatus according to a first embodiment of the present invention. Refer also to FIGS. 1-2, the USB control apparatus 100 in FIG. 3A further includes a second conversion unit 60, and the second conversion unit 60 is connected between the first connection port 10 and the control unit 30. When the output of the power supply 200 is connected to the first connection port 10, and the output of the power supply 200 outputs the first input source Ps1, the second conversion unit 60 converts a first power V1 of the first input source Ps1 into an input voltage Vin to supply an operation power of the control unit 30, wherein the first power V1 is the output voltage of the power supply 200. Therefore, the required power source of the USB control apparatus 100 is supplied by the first input source Ps1 outputted from the power supply 200, and therefore the USB control apparatus 100 does not need additional power supplied thereto. It should be noted that the second conversion unit 60 is a DC-DC converter, but a type of the converter is not limited. As long as the DC voltage of the USB Type-C connection port, namely the first connection port 10 is converted to operation voltage of the control unit 30, any type of converter is included in the scope of the embodiment.

Figure 3B:
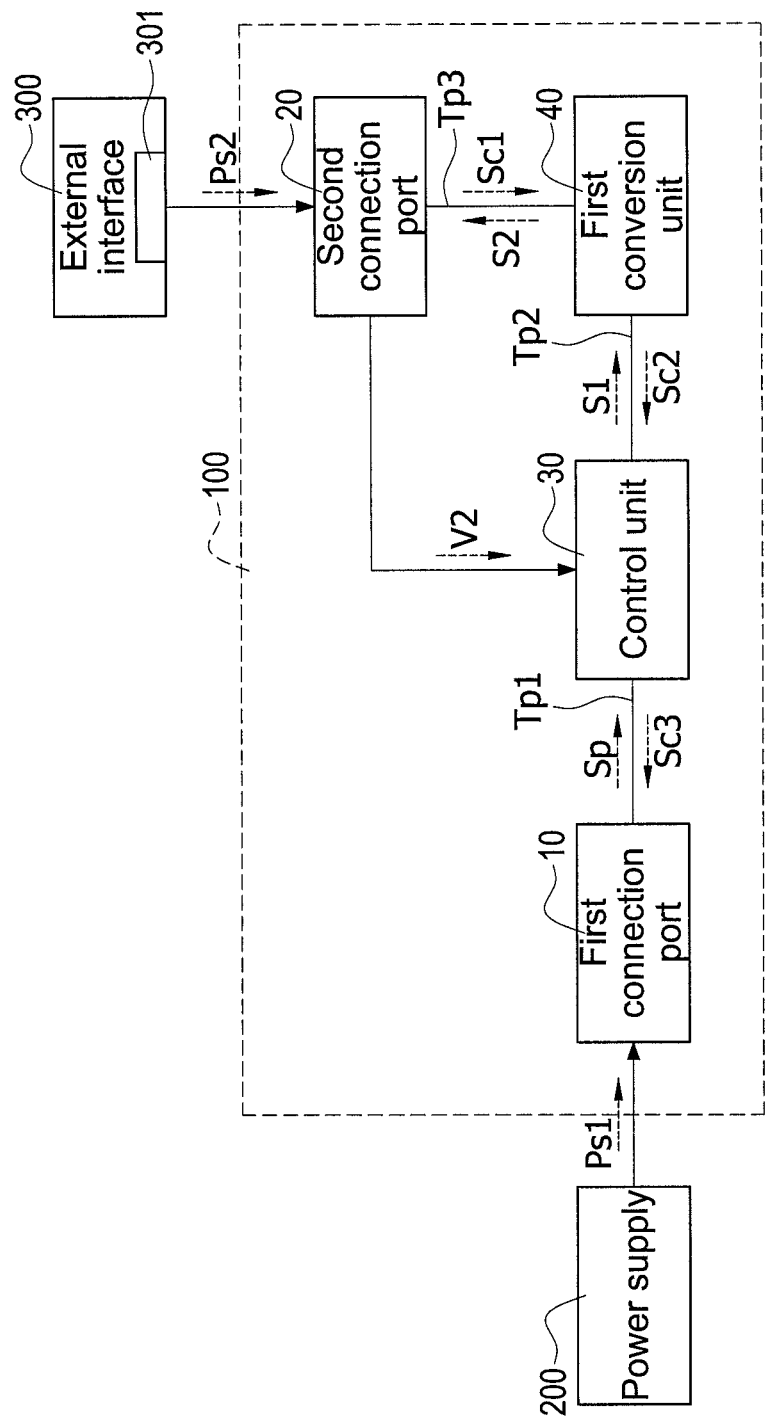
FIG. 3B shows a circuit block diagram about a power supply structure of a USB control apparatus according to a second embodiment of the present invention.

Please refer to FIG. 3B, which shows a circuit block diagram about a power supply structure of a USB control apparatus according to a second embodiment of the present invention. Refer to FIGS. 1-3A again together, a difference between the USB control apparatus 100 in FIG. 3B and first embodiment in FIG. 3A is that the control unit 30 receives a second power V2 of the second input source Ps2 outputted from the external interface 300 through the second connection port 20, to obtain the operation power. Therefore, the required power source of the USB control apparatus 100 is supplied by the second input source Ps2 outputted from the external interface 300, and therefore the USB control apparatus 100 does not need additional power supplied thereto.

Figure 3C:
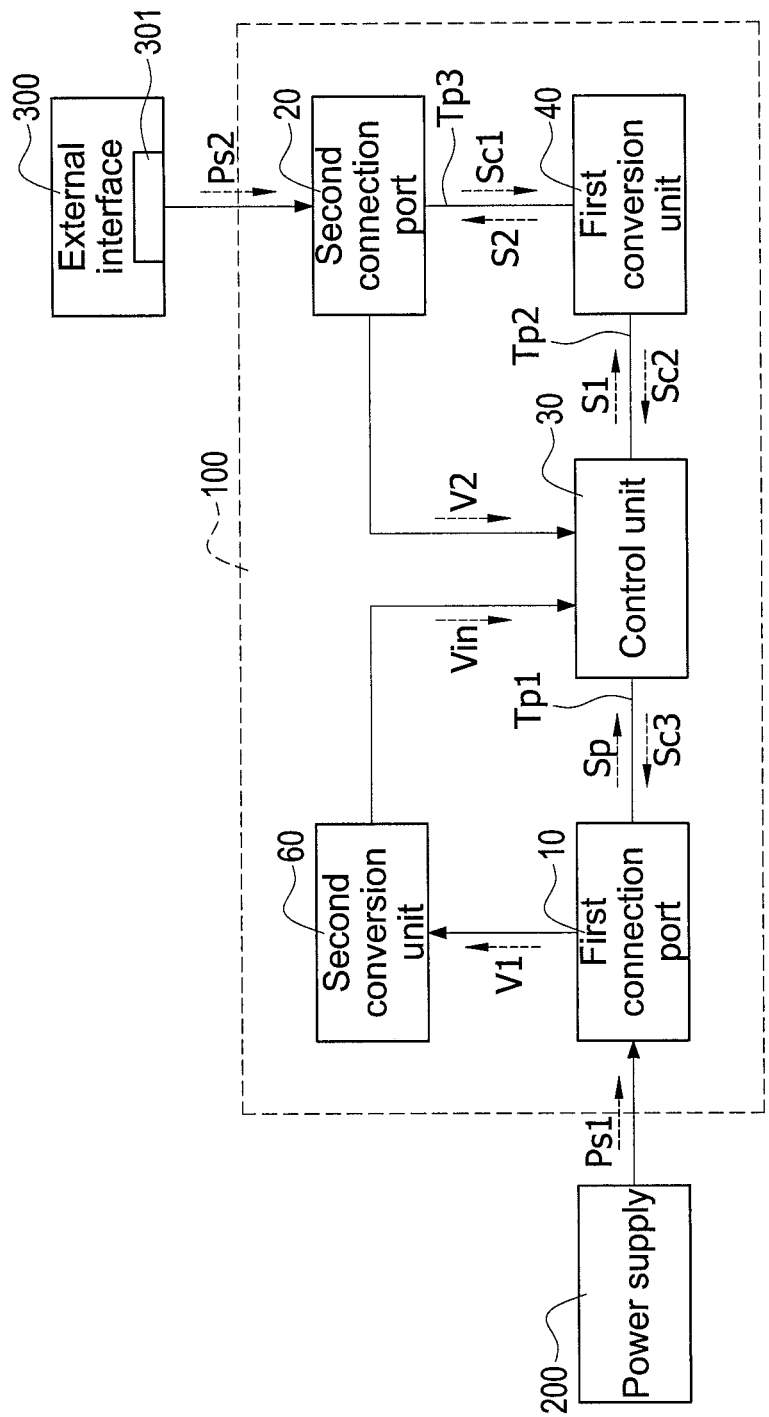
FIG. 3C shows a circuit block diagram about a power supply structure of a USB control apparatus according to a third embodiment of the present invention.

Please refer to FIG. 3C, which shows a circuit block diagram about a power supply structure of a USB control apparatus according to a third embodiment of the present invention. Refer to FIGS. 1-3B, a difference between the USB control apparatus 100 in FIG. 3C and first embodiment in FIG. 3A is that the control unit 30 receives the input voltage Vin converted by the second conversion unit 60 from the output of the power supply 200 through the first connection port 10, or receives a second power V2 outputted from the external interface 300 through the second connection port 20. When the output of the power supply 200 is connected to the first connection port 10, the power source of the USB control apparatus 100 is the first input source Ps1. When the external interface 300 is connected to the second connection port 20, the power source of the USB control apparatus 100 is the second input source Ps2. It should be noted that if the control unit 30 detects both the first input source Ps1 and the second input source Ps2, the control unit 30 can have a determination mechanism. For example, if the first input source Ps1 and the second input source Ps2 are both detected at the same time, the control unit 30 can select either the second input source Ps2 or the first input source Ps1 as the main power source. In this embodiment, the second input source Ps2 is preferably selected as the main power source.

Figure 4:
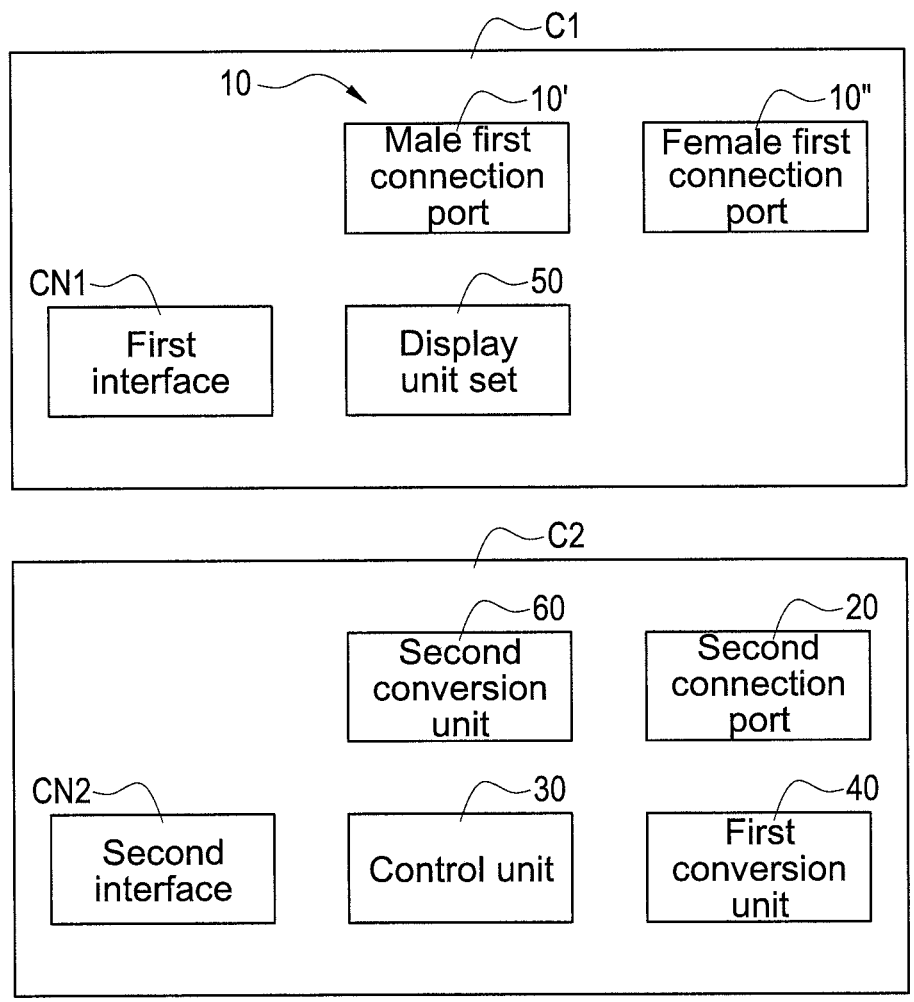
FIG. 4 shows a circuit structure diagram of the USB control apparatus of the present invention.

Please refer to FIG. 4, which shows a circuit structure diagram of the USB control apparatus of the present invention. Refer also to FIGS. 1-3, the USB control apparatus further includes a first circuit board C1 and a second circuit board C2. The first circuit board C1 includes a first interface CN1, and the second circuit board C2 includes a second interface CN2. The first connection port 10 and the display unit set 50 are disposed on the first circuit board C1. The first connection port 10 includes a male first connection port 10' and a female first connection port 10". The second connection port 20, the control unit 30, the first conversion unit 40 and the second conversion unit 60 are disposed on the second circuit board C2. The first connection port 10 and the display unit set 50 are connected to the control unit 30 by jointing the first interface CN1 and the second interface CN2. The control unit 30 is connected to the power supply 200 and the display unit set 50 by jointing the first interface CN1 and the second interface CN2 and controls the power supply 200 and the display unit set 50. In the embodiment, it should be noted that the joint between the first circuit board C1 and the second circuit board C2 are mainly for connecting the first connection port 10 and the display unit set 50 to the control unit 30, and therefore the second connection port 20, the first conversion unit 40 and the second conversion unit 60 are not limited to be disposed on the second circuit board C2. In other words, the second connection port 20, the first conversion unit 40 and the second conversion unit 60 can be disposed on the first circuit board C1, or disposed on a circuit board exclusive of the first circuit board C1 and the second circuit board C2. Besides, the second conversion unit 60 can also be disposed on the first circuit board C1, or disposed on a circuit board exclusive of the first circuit board C1 and the second circuit board C2, to convert the first input source Ps1 into the input voltage Vin supplied for the operation power of the control unit 30. Furthermore, the first connection port 10, the second connection port 20, the control unit 30, the first conversion unit 40, the display unit set 50 and the second conversion unit 60 can only be disposed on a single first circuit board C1, to decrease a volume of entire circuit.

It should be noted that, the display unit set 50 shown in FIG. 2 can be applied in the embodiments in FIGS. 3A-3C, and the power supply structures and power supply routes in FIG. 3A, 3B or 3C can also be applied in the embodiment in FIG. 2. Besides, the circuit structures in the embodiments in FIGS. 2-3C all can be implemented with the circuit structure of the first circuit board C1 and second circuit board C2 connected with each other shown in FIG. 4.

Figure 5:
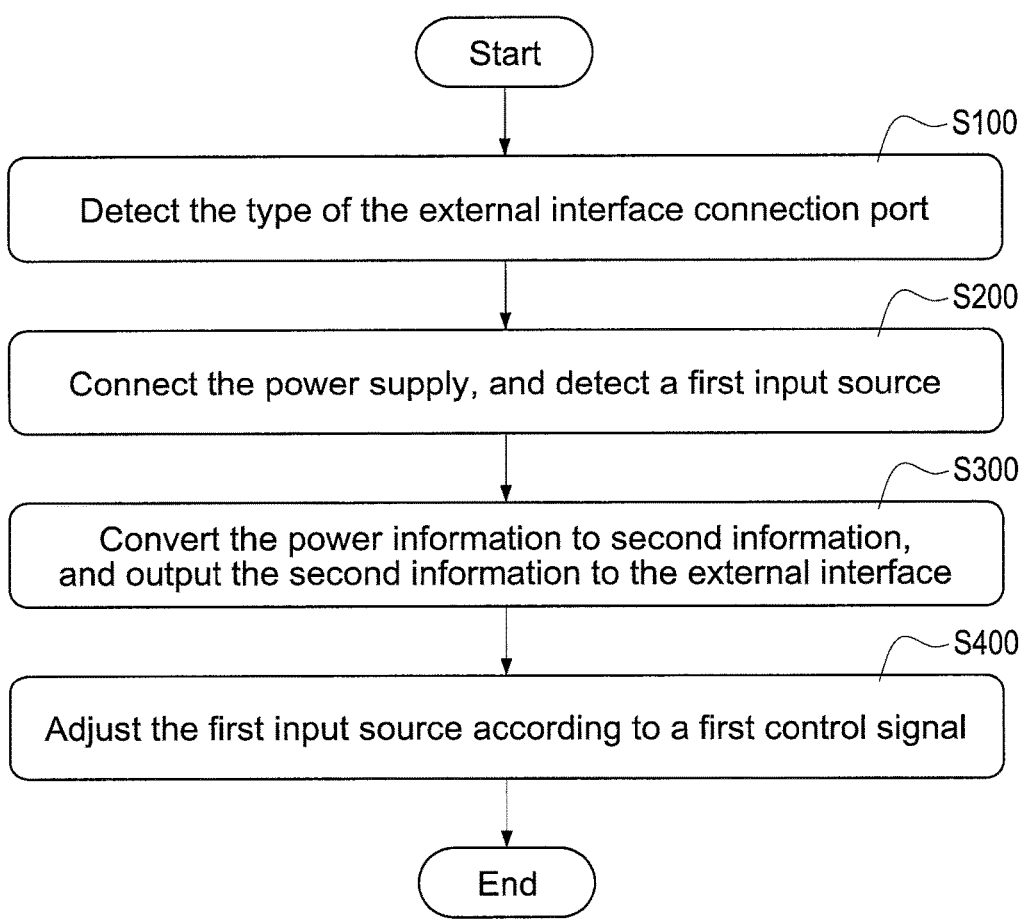
FIG. 5 shows a flowchart about a signal control method of the USB control apparatus of the present invention.

Please refer to FIG. 5, which shows a flowchart about a signal control method of the USB control apparatus (hereinafter referred to as "USB signal control method") of the present invention. Refer also to FIGS. 1-4, the USB signal control method performs signal controls between the power supply 200 and the external interface 300. The signal control method includes the following steps. Firstly, detecting the type of the external interface connection port (S100). The method is applied to a USB control apparatus 100, and the USB control apparatus 100 includes a first connection port 10, a second connection port 20, a control unit 30 and a first conversion unit 40. When the external interface 300 is connected to the second connection port 20, the first conversion unit 40 detects the type of the connection port of the external interface 300, and adjusts the signal conversion type of the first conversion unit 40. Then the power supply is connected, and a first input source is detected (S200). When the output of the power supply 200 is connected to the first connection port 10 and outputs the first input source Ps1, the control unit 30 detects power information Sp of the first input source Ps1. The power information Sp includes, for example but not limited to, the current output voltage of the power supply 200, the voltage sets supportable by the power supply 200, the different voltage sets supportable by the power supply 200, the maximum output current of the power supply 200 and success/failure of switching between different voltages. Then the power information is converted into second information, and the second information is outputted to the external interface (S300). The control unit 30 converts the power information Sp of the first input source Ps1 into first information S1, and outputs the first information S1 to the first conversion unit 40. The first conversion unit 40 converts the first information S1 into the second information S2 corresponding to the connection port of the external interface 300, and outputs the second information S2 to the second connection port 20. Finally, the first input source is adjusted according to a first control signal (S400). After the external interface 300 receives the second information S2, a first control signal Sc1 is outputted to adjust the voltage of the first input source Ps1. After the first conversion unit 40 receives the first control signal Sc, the first control signal Sc1 is converted into a second control signal Sc2 compatible with the control unit 30. After the control unit 30 receives the second control signal Sc2, the second control signal Sc2 is converted into a third control signal Sc3, and the third control signal Sc3 is outputted to the first connection port 10 to adjust the voltage of the first input source Ps1 of the power supply 200.

The USB signal control method further includes providing a display unit set 50. A first display unit 51 of the display unit set 50 displays whether the control unit 30 detects the first input source Ps1 or whether the control unit 30 outputs the signal to adjust the first input source Ps1, thus acquiring the communication status between the control unit 30 and the power supply 200. A second display unit 52 of the display unit set 50 further displays whether the ground voltage (potential) of the USB control apparatus 100 is normal to determine whether the USB control apparatus 100 is normal or damaged. The display unit set 50 further includes a third display unit 53. The third display unit 53 displays the voltage of the first input source Ps1, and when the control unit 30 outputs the third control signal Sc3 to increase or decrease the voltage of the first input source Ps1 through the first transmission route Tp1, the third display unit 53 correspondingly displays the difference between the increased and decreased voltages of the first input source Ps1.

The USB signal control method further includes providing a first power supply route L1 and a second power supply route L2. The first power supply route L1 is provided for that the first input source Ps1 is converted into the input voltage Vin to supply the control unit 30 through a second conversion unit 60, and therefore the required power source of the USB control apparatus 100 is supplied by the first input source Ps1. The second power supply route L2 is provided for that the second input source Ps2 is outputted from external interface 300 to supply the control unit 30, and therefore the required power source of the USB control apparatus 100 is supplied by the second input source Ps2.

In summary, the present invention has the following advantages:

1. Detecting the power information of the power supply through the control unit to make the external interface be informed of the current output voltage of the power supply, the different voltage sets supportable by the power supply, the maximum output current of the power supply and success/failure of switching between different voltages.

2. Converting the signal type corresponding to the external interface connection port through a conversion unit, and therefore there is no need to cooperate with a fixed external interface, resulting in the usage convenience.

3. Using the characteristic of the first circuit board and second circuit board jointed with each other, and therefore the volume of the USB control apparatus can be decreased, resulting in the convenience of being integrated in the system.

Thus, particular embodiments have been described. Other embodiments are within the scope of the following claims. For example, the actions recited in the claims may be performed in a different order and still achieve desirable results.

What is claimed is:

1. A USB control apparatus connected between a power supply with a power delivery function and an external interface, the power delivery function causes the power supply to provide a first input source with a plurality of voltage values, and the USB control apparatus comprising:
    a first connection port connected to the power supply;
    a second connection port connected to the external interface;
    a control unit connected to the first connection port; and
    a first conversion unit connected between the control unit and the second connection port;
    wherein the control unit is configured to detect the first input source and a power information of the first input source outputted through the first connection port and is configured to output first information to the first conversion unit according to the power information; the first conversion unit is configured to detect a type of a connection port of the external interface and convert the first information into second information corresponding to the connection port of the external interface to the second connection port so that the external interface is configured to know a voltage value of any of the plurality of voltage values and a number of the plurality of voltage values.

2. The USB control apparatus of claim 1, wherein the first conversion unit receives a first control signal outputted from the external interface through the second connection port, and the first conversion unit converts the first control signal into a second control signal to the control unit; the control unit is configured to adjust the voltage value of the first input source of the first connection port according to the second control signal.

3. The USB control apparatus of claim 2, wherein the control unit communicates with the first conversion unit through an asynchronous serial communication port, and the control unit receives the second control signal and outputs the first information to the first conversion unit through the asynchronous serial communication port.

4. The USB control apparatus of claim 2, wherein the control unit is configured to detect the first input source, adjust the voltage value of the first input source, and communicate with the power supply connected with the first connection port through a transmission route.

5. The USB control apparatus of claim 4, further comprising:
    a display unit set connected to the control unit and configured to display whether the control unit detects the first input source or whether the control unit adjusts the voltage value of the first input source through the transmission route.

6. The USB control apparatus of claim 5, wherein the display unit set is configured to display whether a ground voltage of the USB control apparatus is normal.

7. The USB control apparatus of claim 5, wherein the display unit set comprises:
    a display unit connected to the control unit;
    wherein the control unit is configured to adjust brightness of the display unit according to the voltage value of the first input source.

8. The USB control apparatus of claim 5, further comprising:
    a first circuit board comprising a first interface;
    a second circuit board comprising a second interface;
    wherein the first connection port and the display unit set are disposed on the first circuit board, and the control unit is disposed on the second circuit board; the first connection port and the display unit set are connected to the control unit by a joint between the first interface and the second interface.

9. The USB control apparatus of claim 1, further comprising:
    a second conversion unit connected between the first connection port and the control unit, and configured to convert the first input source into an input voltage to the control unit;
    wherein a power source of the USB control apparatus is the first input source.

10. The USB control apparatus of claim 1, wherein the control unit is configured to receive a second input source outputted from the external interface through the second connection port;
    wherein a power source of the USB control apparatus is the second input source.

11. The USB control apparatus of claim 1, wherein the first connection port is one of a male connection port and a female connection port, and is connected to the power supply with a USB power delivery function.

12. A signal control method used for signal controls between a power supply with a power delivery function and an external interface, the power delivery function causes the power supply to provide a first input source with a plurality of voltage values, the signal control method comprising steps of:
    (a) providing a USB control apparatus to detect a type of a connection port of the external interface;
    (b) connecting the USB control apparatus to the power supply, and detecting the first input source outputted and a power information;
    (c) converting the power information into second information corresponding to the connection port of the external interface, and outputting the second information to the external interface so that the external interface is configured to know a voltage value of any of the plurality of voltage values and a number of the plurality of voltage values; and (d) adjusting a voltage value of the first input source according to a first control signal outputted from the external interface by the USB control apparatus.

13. The signal control method of claim 12, further comprising a step of:

providing a display unit set, the display unit set displays whether a control unit in the USB control apparatus detects the first input source or whether the control unit adjusts the voltage value of the first input source.

14. The signal control method of claim 13, further comprising a step of:

displaying whether a ground voltage of the USB control apparatus is normal by the display unit set.

15. The signal control method of claim 14, further comprising a step of:

adjusting brightness of the display unit according to the voltage value of the first input source by the control unit.

16. The signal control method of claim 12, wherein a power source of the USB control apparatus is the first input source.

17. The signal control method of claim 12, wherein a power source of the USB control apparatus is a second input source outputted from the external interface.

* * * * *